Dec. 13, 1955     J. J. ZRODOWSKI     2,726,523
LUBRICATION ARRANGEMENT FOR FLEXIBLE COUPLINGS
Filed April 1, 1953
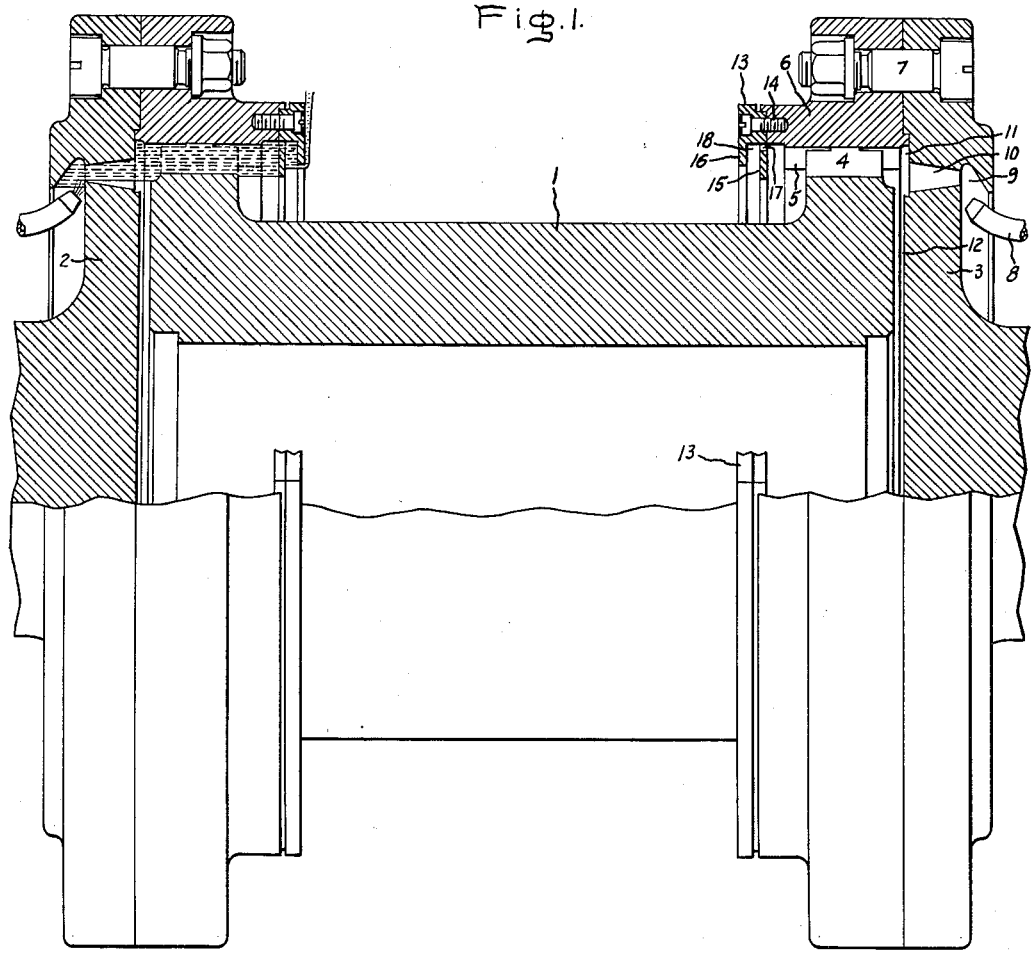
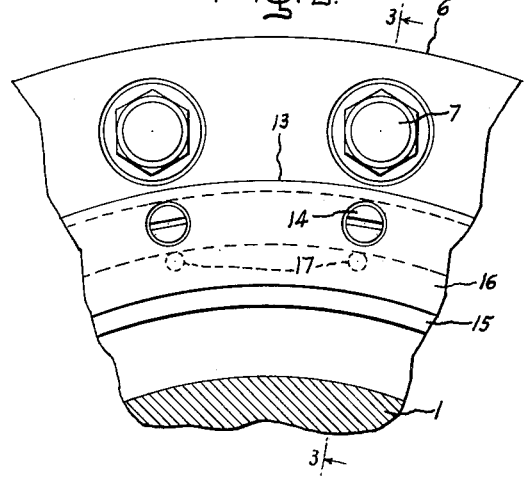
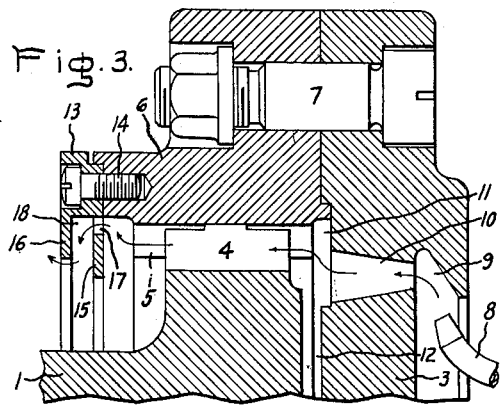
Inventor:
Joseph J. Zrodowski,
by Richard E. Haley
His Attorney.

United States Patent Office 2,726,523
Patented Dec. 13, 1955

2,726,523

LUBRICATION ARRANGEMENT FOR FLEXIBLE COUPLINGS

Joseph J. Zrodowski, Wakefield, Mass., assignor to General Electric Company, a corporation of New York Application April 1, 1953, Serial No. 346,110

4 Claims. (Cl. 64—9)

This invention relates to flexible couplings of the type having a sleeve member with external spline teeth at either end thereof, adapted to engage internal teeth in the end members of adjacent rotors. The novelty resides particularly in an improved lubricating arrangement for the meshing teeth of such a coupling.

The invention was developed specifically in connection with high speed flexible couplings used to connect marine propulsion turbines and gears to a propeller shaft. In such service, it is customary to circulate sufficient oil to keep the interengaging parts cool, as well as provide the required lubrication. Over a long period of time, it is inevitable that oxidation and the normal entrainment of dirt particles will result in formation of a "sludge" in the lubricating oil. With flexible coupling arrangements in accordance with the prior art, it has been found that this sludge tends to be separated by centrifugal force and is deposited adjacent the root portions of the internal spline teeth members. Eventually this deposit may build up to a point where it will interfere with proper lubrication of the coupling teeth.

Accordingly, the purpose of the present invention is to provide an improved lubricating arrangement for a flexible coupling of the type described including special means for insuring that any sludge centrifuged from the lubricating oil will be promptly removed from the vicinity of the intermeshing gear teeth.

Other objects and advantages will become apparent from the following description taken in connection with the accompanying drawings, in which Fig. 1 is a longitudinal view, in section, of a flexible coupling incorporating the invention, Fig. 2 is a partial elevation view of the special annular oil dam member required in practicing the invention, and Fig. 3 is an enlarged diagrammatic view illustrating the operation of the improved lubricating arrangement.

Generally stated, the invention is practiced by providing a special annular oil dam adjacent the toothed coupling members so arranged that the teeth are continuously submerged in fresh oil, while special drain ports provide for continuous removal of any entrained solid particles so that detrimental sludge is not permitted to build up in the teeth.

Referring now more particularly to Fig. 1, the invention is illustrated as applied to a flexible coupling comprising a sleeve member 1 interposed between two rotor end flange members 2, 3. Since the construction at one end of the sleeve duplicates that at the other end, only one has reference numerals applied thereto. The shading on the left-hand sectional view illustrates the annular body of oil submerging the gear teeth.

It will be appreciated by those skilled in the art that a conventional coupling of this type comprises external gear or spline teeth formed on the end of the sleeve member, identified 4, meshing with internal teeth 5 formed in a ring member 6, secured by a circumferential row of bolts 7 to the rotor end flanges 3. Lubrication for the meshing spline teeth is provided by an oil supply nozzle 8, discharging into an annular recess 9 formed in the adjacent end face of rotor flange member 3. From supply chamber 9, oil passes through a plurality of supply ports 10 to the annular chamber 11 containing the intermeshing teeth.

It will be observed that the coupling sleeve member 1 is adapted to "float" axially a limited distance as represented by the clearance spaces 12 defined between the rotor end flanges 2, 3 and the respective ends of the sleeve. In view of this limited axial motion, the internal teeth 5 are of substantially greater face width than the teeth 4.

It is customary in coupling arrangements of this type to provide an oil dam ring, the dimensions of which determine the radial thickness of the rotating body of oil maintained in the annular chamber 11. Such a ring is shown at 13 as being secured by suitable threaded fastenings 14 to the ring member 6. It will be apparent that this ring must be made in two or more arcuate segments to permit assembly.

In accordance with the present invention, this dam member has not one but two axially spaced portions identified 15, 16. It is to be particularly noted that the portion 15 has an internal diameter substantially less than that of the portion 16. More specifically, the internal diameter of the dam 15 is substantially of the same order of magnitude as the root diameter of the teeth 4. This diameter may be the same as, or very slightly greater than, the root diameter of teeth 4; but ordinarily it will be less than the root diameter. On the other hand, the internal diameter of the dam 16 is on the order of that of the tips of the internal teeth 5. The important feature is that the inner diameter of dam ring 16 is subsantially greater than that of ring 15. As may be seen more clearly in the detail view of Fig. 2, the ring portion 15 is provided with a plurality of circumferentially spaced drain ports in the form of small holes or slots identified 17. In Figs. 1 and 3 it will be seen that these holes communicate in an axial direction between the chamber 18 and the extreme outer portion of the annular chamber 11 containing the gear teeth 4, 5. As seen in Fig. 2, there are a sufficient number of the circumferentially spaced ports 17 to provide adequate drainage for all portions of the chamber 11.

The method of operation of this improved lubricating arrangement will be understood by reference to the enlarged detail view in Fig. 3. The oil supplied by nozzle 8 fills the annular recess 9 and is admitted by way of the restricted passages 10 to the annular chamber 11 containing the meshing teeth. The oil dam ring 15 determines the radial thickness of the annular body of lubricant retained in chamber 11, as in the prior art arrangements. The dimensions of the dam 15 are such that the radial thickness of the annular body of the lubricant will be greater than that determined by dam ring 16. This difference in radial thickness of lubricant produces flow thru ports 17. Thus, oil and solid particles are continuously drained from the radially outer portions of chamber 11 by way of the numerous drain ports 17. Spent lubricant is continuously discharged from the drain chamber 18 by flowing in a thin sheet over the inner annular edge of the dam ring 16, as indicated by the flow arrows in Fig. 3, and illustrated by the shading in the left-hand half of Fig. 1.

It will be appreciated that centrifugal force acting on the lubricant retained in chamber 5 causes any dirt particles or solid oxidation products to be centrifuged from the oil and thrown to the outer circumferential portion of chamber 11. The continuous flow of oil through the ports 17, effected by the difference in the radial thickness of the oil in chambers 11 and 18, promptly carries away any such solid particles before they have a chance to form a layer of "sludge" at the roots of the gear teeth 5. These solid particles have some tendency to accumulate in the drain chamber 18, but the comparatively high velocity of the oil through this restricted space tends continuously to wash such particles therefrom. Any particles that do remain in drain chamber 18 can be easily cleaned out by removing oil dam ring 13.

It will be understood by those skilled in the art that the size of the supply ports 10 must be properly correlated with the more restricted area of the drain ports 17, and the supply of oil through conduit 8 so regulated that chamber 9 will be maintained full, so the annular body of oil in chamber 11 will be as shown in the drawing and the rate of discharge through ports 17 will be sufficient to carry away the sludge particles in chamber 18.

While the invention has been described as particularly applicable to lubricating arrangements for flexible coupling teeth, it will be obvious to those skilled in the art that the special oil dam may also be useful in other analogous devices, as for instance for the ring gear in planetary gear trains. It will also be obvious that the precise mechanical design of the parts may assume many equivalent forms; and it is, of course, intended to cover by the appended claims all such modifications as fall within the true spirit and scope of the invention.

What I claim as new and desire to secure by Letters Patent of the United States is:

1. In a lubricating arrangement for a rotating ring gear member having internal teeth, walls defining a first annular chamber surrounding the gear teeth, means for supplying a lubricating liquid to said chamber, said walls including an annular dam ring member disposed adjacent one end of the gear teeth and comprising first and second radially inwardly extending annular wall portions spaced axially to define a second annular chamber, the first annular wall portion being disposed adjacent the teeth and having an internal diameter less than that of the tip diameter of the internal teeth whereby the radial depth of the annular body of lubricant surrounding the teeth is determined, the internal diameter of said second annular wall portion being greater than that of the first, the first annular wall portion having a plurality of circumferentially spaced drain ports communicating with the outer circumferential portion of said first chamber, the portion of each drain port communicating with the second chamber being at a radius from the axis of rotation at least equal to that of the portion of the port communicating with the first chamber, whereby solid particles entrained in the lubricant are centrifugally separated in the first annular chamber and carried therefrom into the second chamber by the high velocity flow of liquid through said drain ports.

2. In a lubricating arrangement for a flexible coupling having a rotating sleeve member with external teeth on at least one end thereof meshing with internal teeth formed on a ring member, walls defining a first annular chamber surrounding the meshing gear teeth, means for supplying a lubricating liquid to said chamber, said walls including an annular dam ring member disposed adjacent one end of the gear teeth and comprising first and second radially inwardly extending annular wall portions spaced axially from each other to define a second annular drain chamber, the first annular wall portion of the dam ring being disposed adjacent the teeth and having an internal diameter substantially of the same order of magnitude as the root diameter of the external teeth on the sleeve, whereby the radial depth of the annular body of lubricant surrounding the teeth is determined, the internal diameter of the second dam ring wall portion being substantially equal to the tip diameter of said internal teeth of the ring gear member, said first annular wall portion having a plurality of circumferentially spaced drain ports communicating between said second annular chamber and the outer circumferential portion of the first annular chamber, the portion of each drain port communicating with the second chamber being at a radius from the axis of rotation at least equal to that of the portion of the port communicating with the first chamber, whereby solid particles entrained in the lubricant are centrifugally separated in the first chamber and carried through the drain ports into the second chamber.

3. In a lubricating arrangement for a rotating ring member having internal gear teeth, the combination of walls defining a first annular chamber surrounding the gear teeth, means for supplying a lubricating liquid to said chamber, said walls including an annular dam ring member adjacent one end of the gear teeth and having first and second radially inwardly extending annular wall portions spaced axially to define a second annular drain chamber, the first of said annular wall portions being disposed adjacent the gear teeth and having an internal diameter substantially less than that of the second annular wall portion whereby the radial thickness of the annular body of lubricant submerging the gear teeth is determined, said first annular wall portion having a plurality of circumferentially spaced drain ports communicating between the second annular chamber and the outer circumferential portion of the first annular chamber, the portion of each drain port communicating with the second chamber being at a radius from the axis of rotation at least equal to that of the portion of the port communicating with the first chamber, whereby the difference in the radial thickness of the bodies of lubricant in said first and second chamber effects continuous flow of lubricant from the first chamber through the drain ports into the second chamber to carry away into the second chamber solid particles separated from the liquid by centrifugal force acting thereon in the first chamber.

4. A lubricating arrangement for a ring gear member in accordance with claim 3, in which the dam ring member is detachably secured to the ring gear member, whereby solid particles deposited in the second annular drain chamber may be readily cleaned out upon detaching the dam ring from the ring gear.

References Cited in the file of this patent

UNITED STATES PATENTS

| 1,616,034 | Fast | Feb. 1, 1927 |
| 1,770,743 | Morgan | July 15, 1930 |

FOREIGN PATENTS

| 914,665 | France | June 24, 1946 |